United States Patent Office 2,765,919
Patented Oct. 9, 1956

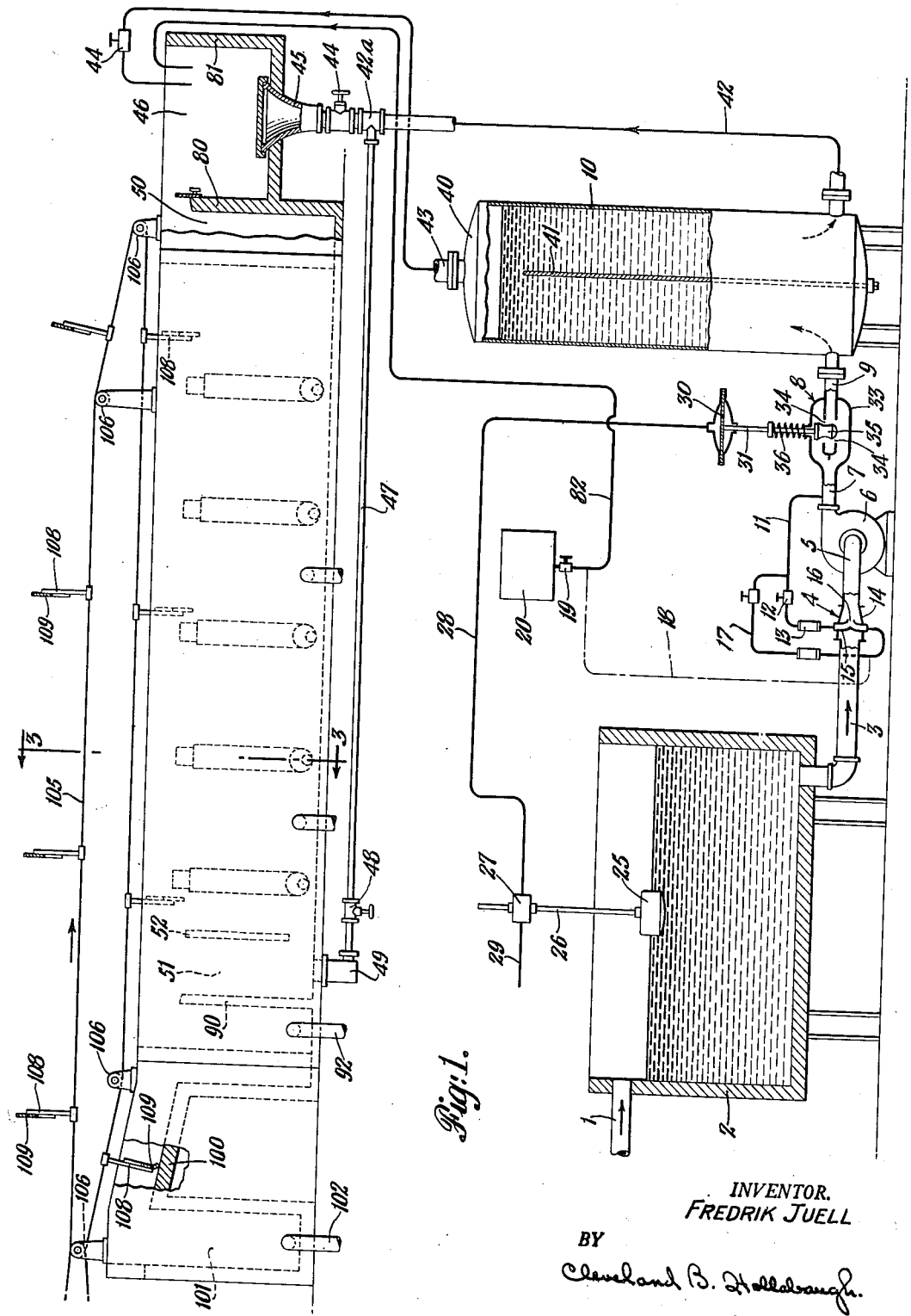

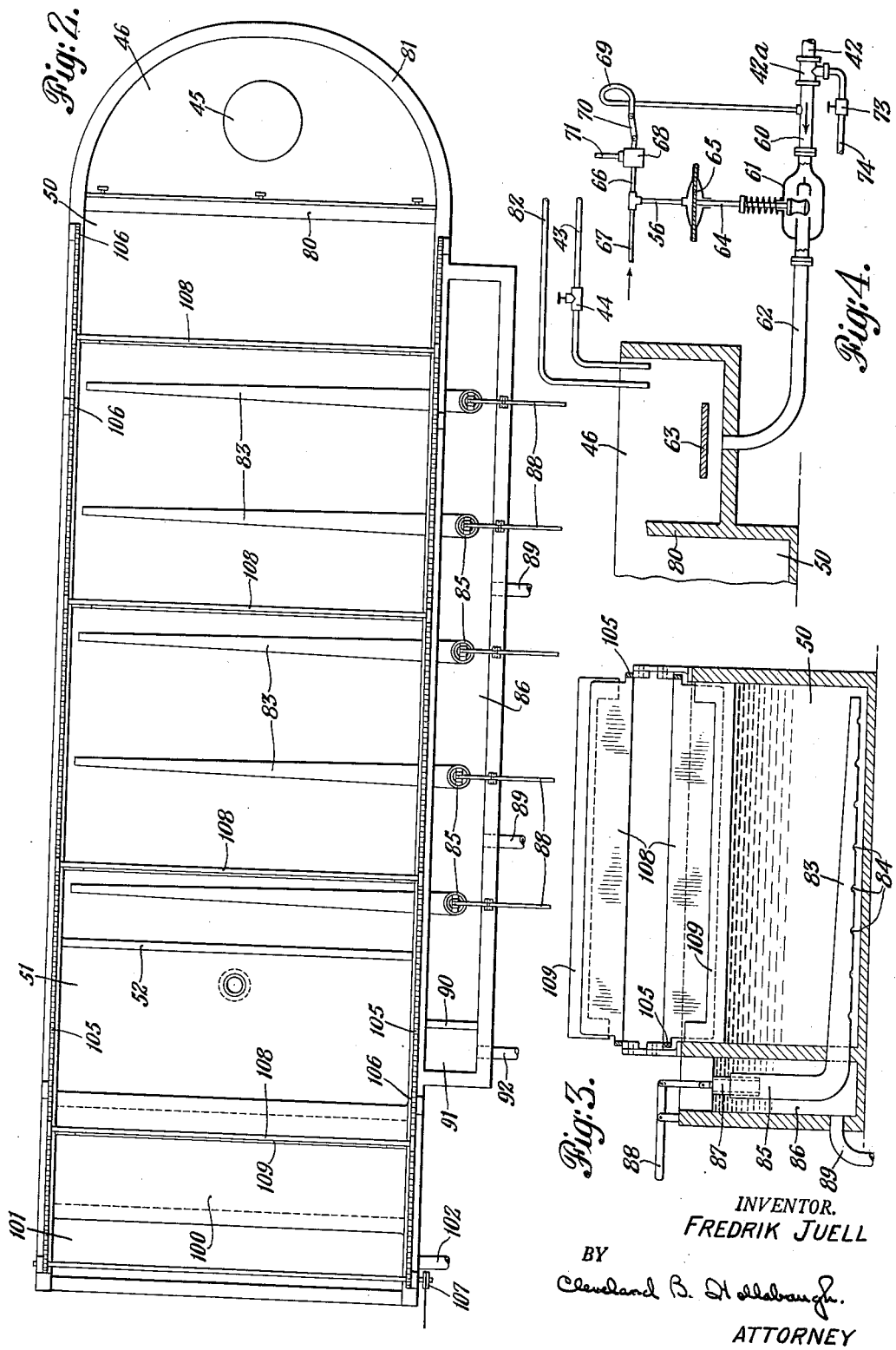

2,765,919

PROCESS FOR THE SEPARATION OF SUSPENDED MATERIAL FROM WATER BY FLOTATION AND APPARATUS THEREFOR

Fredrik Juell, Oslo, Norway

Application April 23, 1952, Serial No. 283,854

10 Claims. (Cl. 210—53)

This invention relates to a process for the separation of suspended material from water by flotation and to apparatus therefor.

A particularly efficient process for the separation of an aqueous suspension of solid particles or droplets of a water-immiscible liquid from an aqueous suspension in which the particles or droplets are concentrated and separated from clarified water is a flotation process in which air is dissolved in the water of the suspension under superatmospheric pressure and then caused to separate from its solution by a release of the pressure. In this process, the air separates from its solution in the form of exceedingly fine bubbles which are uniformly distributed throughout the suspension. These fine bubbles are much more effective in the flotation of suspended particles of a solid or of a water-immiscible liquid for their recovery and for the clarification of the water than the relatively coarse bubbles produced by merely introducing air into the suspension without actually causing it to go into solution.

This flotation process is described in United States Patent No. 1,376,459 issued May 3, 1931, to Nils Pedersen. In a variant of this process the dissolved air is caused to separate from its solution by passing the suspension containing dissolved air through a specially constructed valve described by United States Patent No. 2,330,589 issued September 28, 1943, to me.

This process of flotation has been widely used in the recovery of valuable fiber, filler and other suspended solids from the white water of paper and paperboard mills for reuse as a concentrated suspension in the paper and paperboard producing system and is finding increasing use in widely diversified industries both for the recovery of valuable suspended material and for the clarification of water carrying suspended industrial wastes. In all of these uses the objective is to secure a maximum concentration of the suspended solids or water-immiscible liquids, with a minimum residual suspended material in the clarified water.

This flotation process is carried out as a continuous operation in which the original suspension is continually fed to the apparatus and the concentrated suspension and clarified water continuously removed therefrom. The concentrated suspension is continuously accumulated in the surface layers of the water and continuously removed therefrom in the flotation apparatus. In some of the widely diversified uses of the process, the concentrated suspension is quite fragile and delicate. Even the less delicate concentrates are readily redispersed by currents in the suspension, by relatively large bubbles of air rising through the suspension or by mechanical disturbance from other sources.

Now, in accordance with this invention, I provide both method and apparatus for the separation of solid particles or droplets of a water-immiscible liquid from an aqueous suspension thereof which produces a concentrated suspension containing a higher percentage of solid or of water-immiscible liquid than has heretofore been obtained and which is capable of separating suspensions which give delicate and fragile suspensions in a highly efficient manner. This invention both increases the efficiency of the process in its existing fields of uses and diversifies its fields of usefulness.

The method and apparatus in accordance with this invention achieves increased efficiency by a combination of three interdependent features. First, the air utilized in the flotation is completely dissolved in the suspension prior to the flotation operation, with no bubbles of air which have not been in solution being carried into the flotation step, so that it is carried out entirely by the minute bubbles formed by air coming out of its solution in the suspension. Second, the suspension is caused to flow in the flotation zone in a slowly moving, non-turbulent current which does not disrupt and redisperse the concentrate of suspended material in the top of the water. Third, a relatively small volume of the suspension carrying completely dissolved air is injected into the flotation zone adjacent the point at which the concentrated suspension is finally removed from the zone.

By the method in accordance with this invention, I entrain in a flowing stream of an aqueous suspension an amount of air slightly in excess of that which is to be dissolved therein by the application of pressure. I then pump the stream at a controlled uniform rate of flow through a retention zone in which the suspension is under a controlled superatmospheric pressure, in which the entrained bubbles of air are given sufficient time to dissolve in the water of the suspension to the extent of substantially saturating it at the pressure applied, and in which the excess, undissolved air is removed from the suspension.

The suspension with its water saturated with dissolved air but free of entrained air bubbles is passed out of the retention zone in a stream of constant volume which is still under superatmospheric pressure and through a zone in which the pressure is reduced to or below the prevailing atmospheric pressure. I prefer to reduce the pressure to a point below prevailing atmospheric pressure and then allow it to increase to that pressure. This reduction in the pressure on the suspension causes the dissolved air to come out of its solution in the water of the suspension in the form of uniformly distributed minute bubbles which buoy up the solid particles or water-immiscible droplets of the suspension.

After the pressure on the suspension is released the rate of flow of the suspension is slowed down to a quiescent non-turbulent flow preparatory to its entrance into the flotation zone. While the suspension is passing through this zone or at some prior point, for example, at the point at which I entrain air in the suspension, I add one or more chemicals to the suspension to assist in its flotation. I add such chemicals in the form of an aqueous solution or suspension and distribute them uniformly throughout the suspension. The particular chemical or mixture of chemicals which I add depends upon the nature of the suspension involved. I may add aluminum sulfate, glue, milk of lime, or any one of several other materials to assist in the operation.

The suspension is passed into the flotation zone which consists of an elongated relatively deep pool of the suspension in which the suspended material rises to the surface layer of the water. I cause the suspension to flow into the flotation pool in a quietly flowing stream across the entire width of the pool at its surface level.

In the flotation zone I withdraw clarified water at uniformly spaced intervals just above the bottom of the pool at a rate which is uniform over the entire bottom of the pool. At the same time, the suspended material is being continuously moved along the top of the pool away from the end at which the suspension enters the pool and out of the opposite end. This skimming operation is carried out at a relatively slow speed and in a manner which avoids creating turbulence in the flotation pool, by the use of skimming blades which extend across the entire width of the pool and dip into its top layer. The depth to which the skimming blades dip into the top layer of the pool is adjusted by adjusting the depth of the pool. This depth of skimming is adjusted to give maximum efficiency of operation for the purpose involved, which is most often to obtain a maximum concentration of solids or of water-immiscible liquid in the concentrated suspension removed from the pool by the operation.

A zone of the flotation pool adjacent its exit end is partially separated from the remainder of the pool by a partition which leaves fluid connections at the top and at the bottom zones of the pool. I introduce a stream of suspension carrying minute bubbles of air which have been formed from solution in the water into the bottom of this zone. This suspension is identical with that introduced into the inlet end of the flotation zone but, in volume is only a minor fraction of that introduced at the inlet end.

This introduction of a small volume of suspension near the exit end of the flotation zone increases the volume of air bubbles rising at that point. These bubbles have the effect of increasing the concentration of the mat of suspension passing over that zone to a surprising and unpredictable extent and permits the separation of a more concentrated suspension than has heretofore been possible.

Having now indicated in a very general way the nature of this invention and its advantages, I will now proceed with a more detailed description thereof with reference to the accompanying drawings in which like reference characters are used to refer to like parts wherever they occur. In the drawings:

Figure 1 is an elevation in partial cross-section, of the flotation apparatus and its associated auxiliary equipment in accordance with this invention, Figure 2 is a plan-view of the flotation apparatus illustrated by Figure 1, Figure 3 is a cross-sectional view of the flotation apparatus in accordance with this invention, taken along the section line 3—3 of Figure 1, and Figure 4 is a fragmentary view in partial cross-section of the inlet chamber of my flotation apparatus and of alternative auxiliary equipment which I may use in connection therewith.

Referring now to Figure 1, the improved flotation apparatus in accordance with this invention is provided with a source of the suspension to be treated which is illustrated as conduit 1 from which the suspension flows into a surge tank 2. From the surge tank 2 the suspension is pumped through conduit 3, mixing eductor 4, and conduit 5 by the centrifugal feed pump 6. From the outlet side of the feed pump 6, the suspension and the material mixed therewith in the mixing eductor 4 is pumped through conduit 7, through an automatic volume control valve 8, through conduit 9 and into retention tank 10.

The centrifugal feed pump 6 is by-passed by a small conduit 11 which connects conduit 7 on the outlet side of the pump 6 through a valve 12 and an air injector 13 to the mixing eductor 4 on the inlet side of the pump. A small portion of the suspension flowing through conduit 7 recirculates through conduit 11, and the air injector 13 to the mixing eductor 4. The air injector 13 introduces air into the recirculating suspension which is uniformly admixed into the main stream of the suspension in the mixing eductor 4. The valve 12 is for the purpose of controlling the volume of the recirculating suspension. I recirculate a volume of the suspension and utilize an air injector having a capacity such that I introduce into the mixing eductor 4 a volume of air slightly in excess of that which will dissolve in the suspension under the applied pressure in the retention tank 10.

Under some circumstances, particularly when a large volume of suspension is being handled by the feed pump 6 and the main conduits associated therewith, it is desirable to branch conduit 11 and connect it through two control valves and two air injectors. When using two injectors, their combined capacity should be such that together they introduce a volume of air into the mixing eductor 4 which is slightly in excess of that which will dissolve in the suspension in the retention tank 10.

The air injector 13 which I utilize may be any of the conventional types. Similarly, the mixing eductor 4 may be of a conventional type which introduces the air containing suspension in the center of the base of a conical section 14 of the inductor through conduit 15 and orifice 16, which is centrally positioned in the conduit pointing in the direction of flow of the suspension passing through the conduit. The orifice 16 may also act as the outlet for a second conduit 17. I may connect the second branch of the conduit 11 through the second control valve and second air injector, when such are used, through conduit 17 to orifice 16. Alternatively, I may utilize conduit 17 to feed an aqueous solution of chemicals by connecting it through the alternative conduit 18 shown in dotted outline by the drawing through valve 19 to a chemical supply tank 20.

The surge tank 2 is provided with a float 25 which rises and falls with the level of the top of the body of suspension in the tank and controls the valve 8 to produce a constant rate of flow through the conduit 9 with fluctuating hydrostatic heads in the surge tank 2. The float 25 may, for example, control valve 8 through a pneumatic control system. In the pneumatic system shown diagrammatically by the drawing, as the float 25 is raised by an increasing hydrostatic head in the surge tank 2, the connecting rod 26 acting through a control mechanism 27 increases the air pressure in the conduit 28 from a pressure source 29, acting on the diaphragm 30 which, in turn, acts through the spring-loaded valve stem 31 to reduce the orifice or orifices of the control valve. As the float 25 is lowered by a decreasing hydrostatic head, the reverse action takes place and the orifices of the control valve are enlarged.

The automatic control valve 8 which I utilize may be any one of a variety of conventional control valves which are sensitive in their operation. In following the alternative mentioned hereinbefore in which I introduce my chemical feed into the suspension in the mixing eductor 4, it is important that the liquid passages through the valve be streamlined to give a smooth flow of the suspension through the valve which has a minimum disruptive effect on any floc which has formed in the suspension by the time it reaches the valve.

The control valve 8, for example, may be a conventional spring loaded, double orifice valve of the type which is widely used as flow control valves, as illustrated diagrammatically by the drawing. As shown this valve consists of a casing 33 which divides the incoming stream of suspension into two approximately equal parts which flow through the ports 34, 34 into the outlet of the valves. The orifices provided by the ports 34, 34 are controlled by the double valve plug 35 on the valve stem 31. The compression spring 36 around the valve stem 31 tends to keep the double plug 35 in the open position and to oppose the downward movement of the valve stem 31. The orifices are reduced as the double plug is moved downwardly by the valve stem 31 and increased as it is moved upwardly.

The retention tank 10 may, for example, be in the form of an upright cylinder having a domed or conical top 40 which is provided with an intermediate baffle 41 between the inlet conduit 9 and its outlet conduit 42. The domed or conical top of the retention tank is connected to a conduit 43 which carries a valve 44 and functions as a gas bleed line.

The suspension and its entrained bubbles of undissolved air flowing from conduit 9 into the retention tank 10 flows upwardly in the tank over the top of the baffle 41 and then downwardly and out through the conduit 42. In the course of this flow, the suspension is retained in the tank for a period of time sufficient to allow the entrained bubbles of air which it carries to dissolve in the water to form a substantially saturated solution. The valved bleed line 43 allows the slight excess of air which does not dissolve but collects in the top of the tank, to be bled off at a pressure below that at which it will create an air lock in the tank. The valve 44 is adjusted to provide the proper back pressure to retain a small amount of air in the dome or cone of the retention tank and ordinarily need be only barely cracked to allow the escape of the excess air. In any case, the liquid in the tank will rise and substantially seal the line should there be no excess gas in the dome, so that the pressure on the suspension is not lost. The conduit 43 may, as shown by the drawing, terminate at inlet chamber of the flotation chamber, so that any suspension which flows through it will be returned to the system.

The suspension carrying its dissolved air leaves the retention tank 10 through conduit 42 and passes to a T 42–a in which it is divided into two streams, one of which is the major stream. The major stream passes through volume control valve 44 and on through pressure release valve 45 positioned in the bottom of the inlet chamber 46 of the flotation apparatus. The minor stream, which is small in volume as compared with the major stream, passes out of the T 42–a through the conduit 47, through a second volume control valve 48 and finally through a second pressure release valve 49 positioned in the bottom of a zone 51 of the flotation chamber 50 near its exit end, which is partially separated from the remainder of the chamber by a baffle 52. By regulating the valves 44 and 48 the relative volumes of the suspension flowing into the inlet chamber and directly into zone 51 of the flotation chamber through pressure release valves 45 and 49, respectively, can be accurately controlled and, if desired, pressure release valve 49 taken completely out of service by closing valve 48. In general, the volume of the minor stream will, for example, approximate 5% of the volume of the major stream.

During the passage of the suspension through pressure release valves 45 and 49 and after its emergence from the valves, the dissolved air which it carries comes out of solution and forms minute, uniformly distributed bubbles of air which effect the flotation. I prefer to use as pressure release valves 45 and 49, valves of the type described by my United States Patent 2,330,589 as illustrated by Figure 1, since this valve places the suspension under subatmospheric pressure immediately prior to its release and thereby expedites the release of the dissolved air as a gas phase.

Figure 4 shows an automatic volume control valve and its associated equipment which I may use as an alternative to pressure release valve 45. Referring specifically to that figure, the suspension from the retention tank flows through conduit 42, to the T 42–a where it is divided into two streams, the main one of which passes through conduit 60 into the control valve 61 which is identical in operation to the automatic volume control valve 8 which has been described hereinbefore. In valve 61 the suspension passes through the two ports of the valve and out through conduit 62 to the inlet tank 46 of the flotation apparatus in which it flows against the horizontal, circular baffle 63 positioned somewhat above the orifice of conduit 62. The position of the stem 64 of the valve, the position of the double plug of the valve and, hence, the orifices afforded by the ports of the valve are controlled by a suitable control mechanism which is governed by the pressure of the suspension in conduit 60.

Figure 4 illustrates the use of a pneumatic control mechanism for regulating the control valve 61. This mechanism consists of a pneumatic diaphragm 65 the position of which is controlled by the pressure of the air in conduit 56 which is attached through conduit 67 to a source of compressed air under a uniform pressure. The air pressure in conduit 66 is in turn controlled by an air valve 68. A Bourdon tube 69 opens off of conduit 60 and responds to the pressure of the suspension in that conduit. The closed end of the Bourdon tube 69 controls the air valve 68. As the pressure in the conduit 60 increases, the end of the Bourdon tube moves away from the valve and by the control rod 70 opens the air valve 68 more and more widely permitting an increasing amount of compressed air to escape from the valve through conduit 71, thus decreasing the pressure in conduit 56 and on the diaphragm 65. The diaphragm 65 operates against the spring loading of valve 61 and causes it to open. Conversely, a decrease in the pressure in the conduit 60 closes the valve 61. Thus, the control mechanism controls the pressure in the conduit 60 by the adjustment of the valve 61, with the result that the drop in the pressure on the suspension remains constant.

The T 42–a is connected through valve 73 to conduit 74 which is, in turn, connected to a valve (not shown by the drawing) which is a duplicate of valve 61 as to construction, but smaller in capacity. This valve is controlled by apparatus duplicating that shown for valve 61 and has an exit conduit opening into the bottom of zone 51 of the flotation chamber 50. The valve 73 permits the volume of suspension flowing to conduit 74 to be regulated or, if desired, the conduit can be entirely closed off.

Referring again to Figure 1, and to Figures 2 and 3, it will be seen that the flotation apparatus which I utilize consists of the inlet chamber 46 which is separated from a flotation chamber 50 by a weir or leveling board 80 which is adjustable in height and which produces a uniform quiet flow of the suspension and its entrained air bubbles from the inlet chamber to the flotation chamber, across the entire width of the flotation chamber. It will be noted in Figure 1 that the inlet chamber is more shallow than the flotation chamber and in Figure 2 that its wall 81 is curved almost to a semi-circular form. This rounded form of the inlet chamber is advantageous in creating smooth, non-turbulent flow of the suspension in the inlet chamber and over the top of the weir 80.

As already mentioned, I may introduce an aqueous solution or suspension of a chemical or chemicals to assist in the flotation of the suspension which may be introduced into the suspension as it passes through the mixing eductor 4 from supply tank 20 through conduit 18. Alternatively, I may introduce the chemicals into the suspension in the inlet chamber through the conduit 82.

The flotation chamber 50 is rectangular in plan and is relatively deep. It has a series of tapered conduits 83, 83, 83 . . . positioned at spaced intervals across its width, a short distance above its bottom. Each of these tapered conduits is provided with a series of inlet orifices 84, 84, 84 . . . , positioned at regular intervals along its lower side. These tapered conduits are connected at their large ends to the vertical conduits 85, 85, 85 . . . positioned in a clarified water chamber 86 which is positioned along one side of the flotation chamber 50.

These vertical conduits 85, 85, 85 . . . are each provided with an adjustable sleeve 87 which allows their height and the level of the orifice formed by the open end of the sleeves to be adjusted to any desired position. The levers 88, 88, 88 . . . provide a convenient means for adjusting the position of the sleeves 87, 87, 87 . . . .

The clarified water chamber is provided with conduits 89, 89 through which clarified water may be removed from the chamber 86. It is also provided, at one end, with a weir 90 over which excess clarified water can flow into the sump 91 and out through conduit 92, for example, to a sewer.

The tapered design of the conduits 83, 83, 83 . . . permits them to take in the same volume of water through each of the orifices 84, 84, 84 . . . positioned along their length. The spacing of these orifices along their length, and the spacing of the conduits along the length of the bottom of the flotation chamber 50, causes them to withdraw clarified water from the entire lower zone of the flotation chamber without creating turbulent currents in the chamber which can interfere with the flotation operation. The position of the orifices 84, 84, 84 . . . just above the bottom of the chamber causes the current of water flowing into them to pick up any solid or water-immiscible material which has settled to the bottom of the chamber, rather than floating as desired, and thus prevents the accumulation of such material.

The vertical conduits 85, 85, 85 . . . and their adjustable sleeves 87, 87, 87 . . . function as water legs which determine the depth of the suspension within the flotation chamber 50. By adjusting the position of the sleeves 87, 87, 87 . . . the depth of the suspension may be adjusted as desired. This adjustment of depth of suspension in the flotation chamber is important to the skimming of the concentrated suspension, as will be discussed.

In the operation of this flotation apparatus, the clarified water may be withdrawn from chamber 86 through conduits 89, 89 for reuse and this is ordinarily done, for example, when the apparatus is used for the clarification of white water in a paper or paperboard mill. In such operation, clarified water accumulates in chamber 86 to a point such that it cascades over the weir 90 only in unusual situations. On the other hand, in operations in which the clarified water is not reused, the conduits 89, 89 may lead to a sewer or be omitted and all of the water allowed to go over the weir 90.

The end of the flotation chamber 50 opposite the weir 80 is provided with a ramp 100 which has a gradual upward slope and discharges into a recovered solids chamber 101 which is provided with an outlet conduit 102. The concentrated suspension recovered by the apparatus is pumped from chamber 101 through 102 and may be used or destroyed depending upon its nature. In using the apparatus for the recovery of fiber from paper mill white water, the recovered fiber is pumped out of chamber 101 as an aqueous suspension and returned directly to the paper making system.

A mechanical skimming apparatus or scraper flight assembly is located on top of the flotation chamber 50. This assembly consists of an endless chain or belt 105 positioned along each side of the top of the flotation chamber 50 and the ramp 100. The endless chains or belts 105, 105 are carried by a series of rollers, pulleys, or sprocket wheels 106, 106, 106 and driven in the direction indicated by the arrow of Figure 1 by the roller, pulley or sprocket 107 which is, in turn, driven by a variable speed source of rotary power not shown by the drawing.

The endless chains or belts 105, 105 carry a series of transverse members 108, 108, 108 . . . extending across from one to the other at right angles to their length, which act as paddles to propel the surface layer of the suspension in the chamber 50 from its inlet end, along its length, up the ramp 100 and into the chamber 101. Each of the paddles or skimmer blades 108 is provided with gaskets 109, 109 of a resilient material, for example, natural or synthetic rubber which forms tight connections between the ends of the blade and the side walls of the flotation chamber 50 and of the ramp 100. Each of the gaskets 109 is U-shaped and extends upwardly along each side of the skimmer blade from its long outer edge and forms a tight seal both across the entire width and along the length of the slanting surface of the ramp 100. The edges of the gasket 109 also form a tight seal against the parallel sides of the flotation chamber 50 during their travel along its length.

During the operation of this flotation apparatus, both the inlet chamber 46 and the flotation chamber 50 are kept filled with a suspension containing entrained air bubbles to a level above the top of the weir 80 by the continuous admission of the suspension into the bottom of the inlet chamber through valve 45 (Figure 1) or conduit 62 (Figure 4) depending upon the particular alternative of the apparatus which is being used. The exact level maintained is determined by the adjustment of the sleeves 87, 87, 87 . . . of the vertical water legs 85, 85, 85 . . . already described hereinbefore. The withdrawal of clarified water through the plurality of orifices 84, 84, 84 . . . uniformly spaced over the entire bottom area of the flotation chamber 50 causes the current, created by the suspension coming into the chamber over the weir 80, to become progressively slower as it moves along the length of the chamber until it becomes substantially zero at the end adjacent the ramp 100.

As the skimming mechanism is rotated, successive blades dip into the pool of suspension and move material floating in the upper zone of the suspension slowly along the length of the flotation chamber 50 and up the ramp 100. As each blade moves up the ramp 100, it is sealed along its sides and lower edge by the gaskets 109, 109 so that the suspension cannot flow around the blades and back into the flotation pool causing turbulence in the pool.

The action of the minute air bubbles in carrying the solid particles or droplets of a water-immiscible liquid upwardly in the flotation pool creates a floating blanket of concentrated suspension in the uppermost zone of the flotation pool which decreases in concentration downwardly from the top. When it is desired to obtain a product containing a high percentage of the suspended material and a low percentage of water, the level of the top of the pool is lowered by lowering the tops of the sleeves 87, 87, 87 . . . so that the depth to which each of the skimmer blades enters the pool is decreased. Conversely, if a less concentrated product containing a higher percentage of water is desired, the liquid level in the pool is raised so that the blades dip more deeply into the pool.

The rate at which concentrated suspension is removed from the flotation chamber 50 is determined by the depth to which the skimmer blades are immersed in the suspension and the rate at which they travel. Compensation for the decrease in the rate of production resulting from a decrease in the depth to which the skimmer blades are immersed in the pool can be made by increasing their rate of travel by means of their variable speed drive.

In addition to the control over the concentration of the suspension removed from the flotation chamber by adjusting the depth of immersion of the skimmer blades, I control and increase the concentration of the recovered suspension by the auxiliary introduction of suspension carrying air bubbles in the zone 51 of my flotation chamber. This auxiliary introduction of suspension has the effect of compacting the blanket of concentrated suspension and compensates for the loss of air from the blanket during its travel the length of the pool.

This auxiliary introduction of aerated suspension or "after-thickening" is an important feature of my invention since it permits the concentration of the recovered suspension to be increased to a point above that which is possible without its use. The importance of this feature of my invention can be illustrated in connection with its use in the recovery of fiber from the white water in a paper mill.

In a paper mill system, the consistency of the stock in the machine chest varies between about 2½ and about 3 percent. This stock is diluted to a consistency of about ½ to about 1 percent before it goes onto the Fourdrinier wire of a paper machine by accurately controlled consistency regulators. The fiber content of the white water flowing from the paper machine varies with the character of the paper stock going to the machine and the particular point in the paper machine from which it comes. However, if may, for example, contain 0.084 percent fiber.

It is desirable to recover the fiber from the white water at a consistency at least as high as that of the stock in the machine chest, i. e. about 2½ to about 3 percent air dry weight. In normal operation of my method, without the "after-thickening" step, the consistency of the recovered fiber will vary between about 2 percent to about 3 percent and will ordinarily be about 2½ percent or on the low end of the desired consistency for return to the machine chest. Under some conditions of operation the consistency of the recovered fiber may drop as low as 1 percent. By the use of the "after-thickening" step in accordance with this invention, I can increase the consistency of the recovered fiber by about 1 percent to about 2 percent and thus place it squarely within the desired range.

The apparatus in accordance with this invention is simple, rugged and relatively inexpensive. It requires relatively small amount of space and is capable of automatic operation. It is capable of recovering suspended solids at higher concentrations than other systems designed for the same purpose.

Although in the foregoing repeated reference has been made to the recovery of fiber from the white water of paper mills, this invention is applicable to the separation of a wide variety of aqueous suspensions of both solids and water-immiscible liquids. It finds wide use in the recovery of solids which are useful as fertilizers or animal feeds from the waste waters of a wide variety of food processing plants, such as, for example, fish canneries, fruit drying plants, citrus fruit processing plants, fruit and vegetable canneries, meat packing plants, beet sugar plants, and beverage distilling plants. It is useful in the recovery of solids in synthetic rubber plants and in soap plants and in the separation of water-immiscible oils from brines in petroleum fields, from waste water from petroleum refineries and from the washing of railroad tank cars and locomotives.

What I claim and desire to protect by Letters Patent is:

1. A method for the separation of suspended material from an aqueous suspension thereof which includes placing a flowing stream of the said suspension under superatmospheric pressure and dissolving air therein to produce a solution which is substantially free of undissolved bubbles of air, dividing the said stream of suspension containing dissolved air into two of substantially different volumes, reducing the pressure on each of the two streams to cause the air dissolved therein to come out of solution in the form of uniformly distributed, minute air bubbles, flowing the larger of the two streams in a quietly moving, non-turbulent, shallow stream into the upper part of the end of an elongated, relatively deep pool, withdrawing clarified water at points near the bottom of the said pool which are spaced over substantially its entire area, while skimming the surface zone of the pool from its inlet end to its opposite end and removing concentrated suspension from that end and introducing the smaller of the said streams of suspension into the bottom of a zone of the said pool adjacent its said opposite end.

2. A method for the separation of suspended material from an aqueous suspension thereof which includes placing a flowing stream of the said suspension under superatmospheric pressure and dissolving air therein to produce a solution which is substantially free of undissolved bubbles of air, dividing the said stream of suspension containing dissolved air into two of substantially different volumes, reducing the pressure on each of the two streams to cause the air dissolved therein to come out of solution in the form of uniformly distributed, minute air bubbles, flowing the larger of the two streams in a quietly moving, non-turbulent, shallow stream into the upper part of the end of an elongated, relatively deep pool, withdrawing clarified water at points near the bottom of the said pool which are spaced over substantially its entire area, while skimming the surface zone of the pool from its inlet end to its opposite end and removing concentrated suspension from that end and introducing the smaller of the said streams of suspension into the bottom of a zone of the said pool adjacent its said opposite end which is connected to the remainder of the said pool by liquid passages across its width and across its top and bottom.

3. A method for the separation of suspended material from an aqueous suspension thereof which includes placing a flowing stream of the said suspension under superatmospheric pressure and dissolving air therein to produce a solution which is substantially free of undissolved bubbles of air, reducing the pressure on the said stream to cause the air dissolved therein to come out of solution in the form of uniformly distributed, minute air bubbles, dividing the said stream carrying minute entrained air bubbles into two streams of substantially different volume, flowing the larger of the two streams in a quietly moving, non-turbulent, shallow stream into the upper part of the end of an elongated relatively deep pool, withdrawing clarified water at points near the bottom of the said pool which are spaced over substantially its entire area, while skimming the surface zone of the pool from its inlet end to its opposite end and removing concentrated suspension from that end and introducing the smaller of the said streams of suspension into the bottom of a zone of the said pool adjacent its said opposite end.

4. A method for the separation of suspended material from an aqueous solution thereof which includes placing a flowing stream of the said suspension under superatmospheric pressure, introducing an amount of air into the suspension slightly in excess of that which will dissolve in the suspension under the said superatmospheric pressure and after the air has had sufficient time to substantially saturate the suspension, separating the undissolved air therefrom, dividing the said stream of suspension containing dissolved air into two of substantially different volumes, reducing the pressure on each of the two streams to cause the air dissolved therein to come out of solution in the form of uniformly distributed, minute air bubbles, flowing the larger of the two streams in a quietly moving, non-turbulent, shallow stream into the upper part of the end of an elongated, relatively deep pool, withdrawing clarified water at points near the bottom of the said pool which are spaced over substantially its entire area, while skimming the surface zone of the pool from its inlet end to its opposite end and removing concentrated suspension from that end and introducing the smaller of the said streams of suspension into the bottom of a zone of the said pool adjacent its said opposite end.

5. An apparatus for the flotation of the suspended material in an aqueous suspension thereof comprising an elongated flotation chamber having at one end an inlet passage across its width for a major stream of aqueous suspension containing entrained air bubbles, a plurality of exit orifices for clarified water positioned near its bottom and spaced over its entire area, a skimming mechanism positioned along its length which is capable of skimming the surface layer of a pool of suspension in the chamber and moving material skimmed from the surface layer out of the end of the chamber opposite the said inlet passage, and an inlet orifice for a minor stream of aqueous suspension positioned at the bottom of the said chamber near the end from which the said skimming mechanism removes material therefrom.

6. An apparatus for the flotation of the suspended material in an aqueous suspension thereof comprising an elongated flotation chamber having at one end an inlet passage across its width for a major stream of aqueous suspension containing entrained air bubbles, a plurality of exit orifices for clarified water positioned near its bottom and spaced over its entire area, a skimming mechanism positioned along its length which is capable of skimming the surface layer of a pool of suspension in the chamber and moving material skimmed from the surface layer out of the end of the chamber opposite the said inlet passage, a vertical baffle extending across the width of the said chamber near its exit end from which the said skimming mechanism removes material therefrom, and from a point near the bottom of the chamber upwardly to a point below the normal level of the top of the suspension in the chamber, and an inlet orifice for a minor stream of aqueous suspension positioned in the bottom of zone of the chamber defined by the said baffle and the exit end of the chamber.

7. An apparatus for the flotation of the suspended material in an aqueous suspension thereof comprising a means for dissolving air in a stream of the suspension flowing under a superatmospheric pressure, a means for dividing the said stream of suspension carrying air dissolved therein into two streams of substantially unequal volumes, means for releasing the superatmospheric pressure on each of the said streams to allow the air dissolved therein to come out of solution in the form of minute air bubbles, an elongated flotation chamber having at one end an inlet passage across its width for the major stream of aqueous suspension containing entrained air bubbles, a plurality of exit orifices for clarified water positioned near its bottom and spaced over its entire area, a skimming mechanism positioned along its length which is capable of skimming the surface layer of a pool of suspension in the chamber and moving material skimmed from the surface layer out of the end of the chamber opposite the said inlet passage, and an inlet orifice for the minor stream of aqueous suspension positioned at the bottom of the said chamber near the end from which the said skimming mechanism removes material therefrom.

8. An apparatus for the flotation of the suspended material in an aqueous suspension thereof comprising a means for dissolving air in a stream of the suspension flowing under a superatmospheric pressure, a means for dividing the said stream of suspension carrying air dissolved therein into two streams of substantially unequal volumes, means for releasing the superatmospheric pressure on each of the said streams to allow the air dissolved therein to come out of solution in the form of minute air bubbles, an elongated flotation chamber having at one end an inlet passage across its width for the major stream of aqueous suspension containing entrained air bubbles, a plurality of exit orifices for clarified water positioned near its bottom and spaced over its entire area, a skimming mechanism positioned along its length which is capable of skimming the surface layer of a pool of suspension in the chamber and moving material skimmed from the surface layer out of the end of the chamber opposite the said inlet passage, a vertical baffle extending across the width of the said chamber near its exit end from which the said skimming mechanism removes material therefrom, and from a point near the bottom of the chamber upwardly to a point below the normal level of the top of the suspension in the chamber, and an inlet orifice for the minor stream of aqueous suspension positioned in the bottom of zone of the chamber defined by the said baffle and the exit end of the chamber.

9. An apparatus for the flotation of the suspended material in an aqueous suspension thereof comprising a means for dissolving air in a stream of the suspension flowing under superatmospheric pressure, means for releasing the superatmospheric pressure on the said stream to allow the air dissolved therein to come out of solution in the form of minute air bubbles, a means for dividing the said stream and its entrained air bubbles into two streams of substantially unequal volumes, an elongated flotation chamber having at one end an inlet passage across its width for the major stream of aqueous suspension containing entrained air bubbles, a plurality of exit orifices for clarified water positioned near its bottom and spaced over its entire area, a skimming mechanism positioned along its length which is capable of skimming the surface layer of a pool of suspension in the chamber and moving material skimmed from the surface layer out of the end of the chamber opposite the said inlet passage, and an inlet orifice for the minor stream of aqueous suspension positioned at the bottom of the said chamber near the end from which the said skimming mechanism removes material therefrom.

10. An apparatus for the flotation of the suspended material in an aqueous suspension thereof comprising a means for dissolving air in a stream of the suspension flowing under superatmospheric pressure, means for releasing the superatmospheric pressure on the said stream to allow the air dissolved therein to come out of solution in the form of minute air bubbles, a means for dividing the said stream and its entrained air bubbles into two streams of substantially unequal volumes, an elongated flotation chamber having at one end an inlet passage across its width for the major stream of aqueous suspension containing entrained air bubbles, a plurality of exit orifices for clarified water positioned near its bottom and spaced over its entire area, a skimming mechanism positioned along its length which is capable of skimming the surface layer of a pool of suspension in the chamber and moving material skimmed from the surface layer out of the end of the chamber opposite the said inlet passage, a vertical baffle extending across the width of the said chamber near its exit end from which the said skimming mechanism removes material therefrom, and from a point near the bottom of the chamber upwardly to a point below the normal level of the top of the suspension in the chamber, and an inlet orifice for the minor stream of aqueous suspension positioned in the bottom of zone of the chamber defined by the said baffle and the exit end of the chamber.

References Cited in the file of this patent

UNITED STATES PATENTS

| | | |
|---|---|---|
| 864,856 | Norris | Sept. 3, 1907 |
| 934,246 | Vogler | Sept. 14, 1909 |
| 1,116,903 | McClintock | Nov. 10, 1914 |
| 1,157,176 | Owen | Oct. 19, 1915 |
| 1,167,835 | Norris | Jan. 11, 1916 |
| 1,709,783 | Etheredge | Apr. 16, 1929 |
| 2,005,742 | Hines | June 25, 1935 |
| 2,168,264 | Marshall | Aug. 1, 1939 |
| 2,220,574 | Little et al. | Nov. 5, 1940 |
| 2,248,177 | Karlstrom | July 8, 1941 |
| 2,307,154 | Osuna | Jan. 5, 1943 |
| 2,330,589 | Juell | Sept. 28, 1943 |
| 2,324,400 | Kelly et al. | July 13, 1943 |
| 2,334,703 | Henkel | Nov. 23, 1943 |
| 2,399,938 | Pett | May 7, 1946 |
| 2,446,655 | Lawrason | Aug. 10, 1948 |
| 2,599,534 | Annin | June 10, 1952 |
| 2,645,350 | Nordstrand | July 14, 1953 |